UNITED STATES PATENT OFFICE.

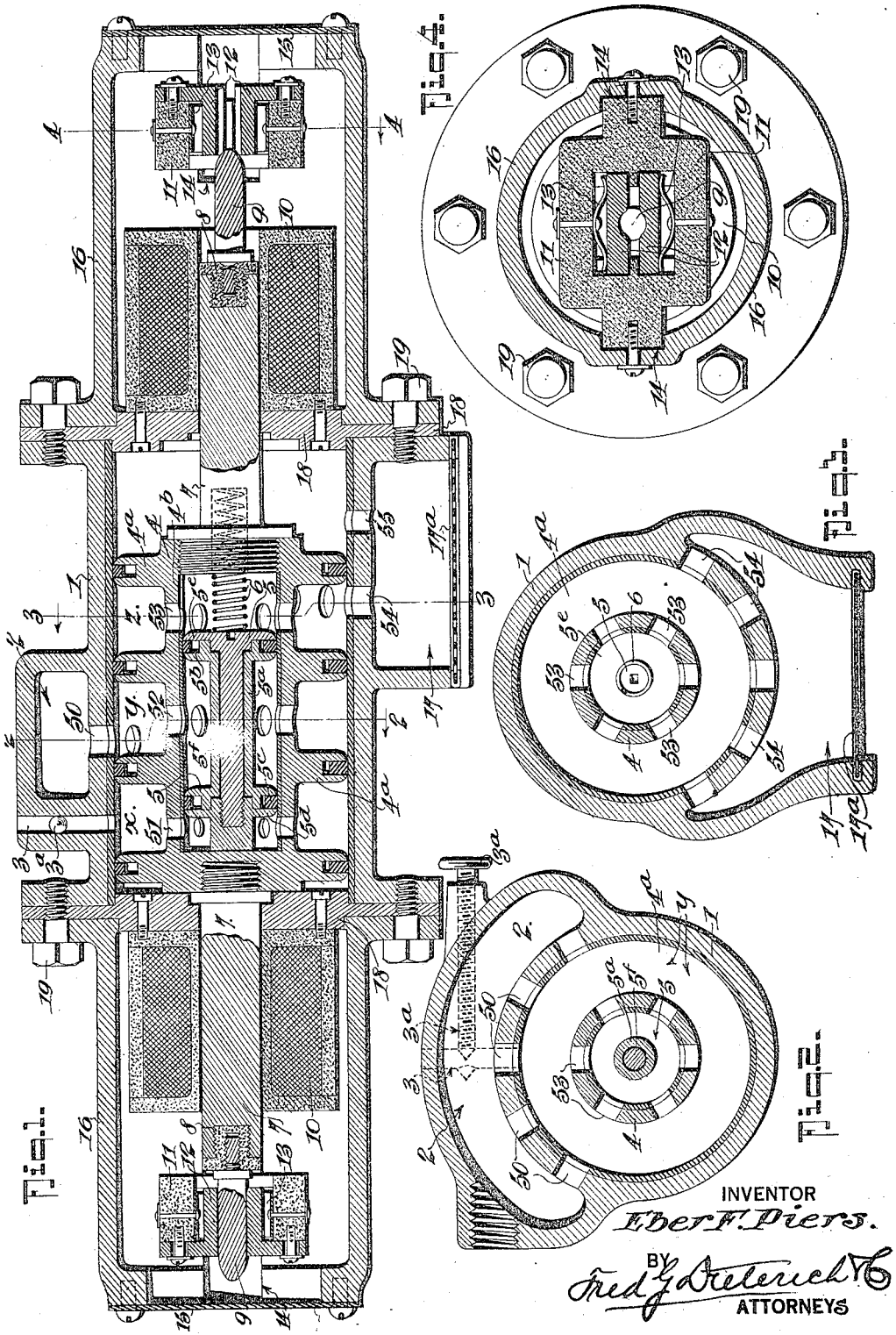

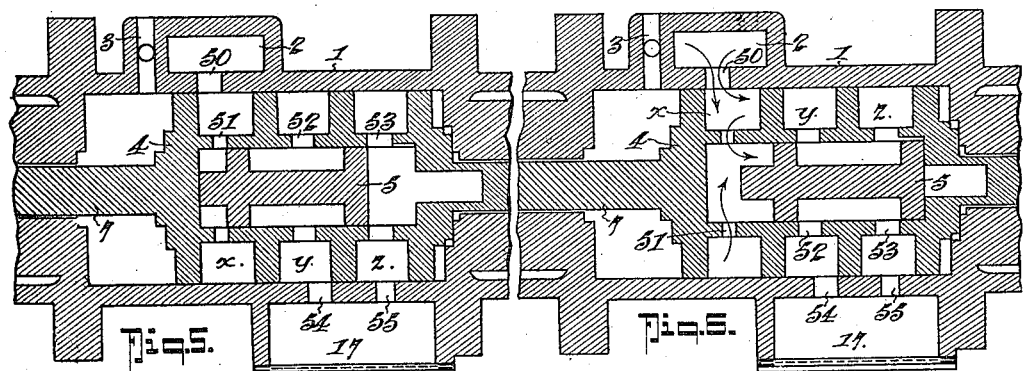
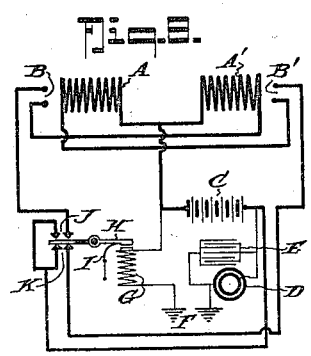
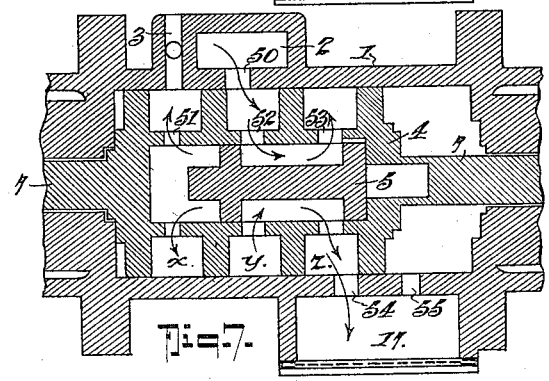
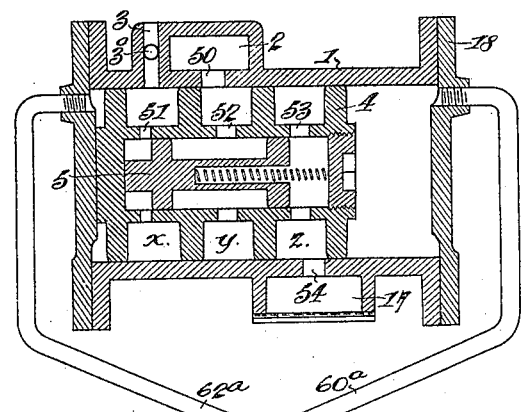
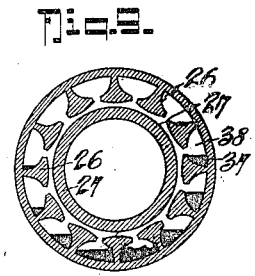
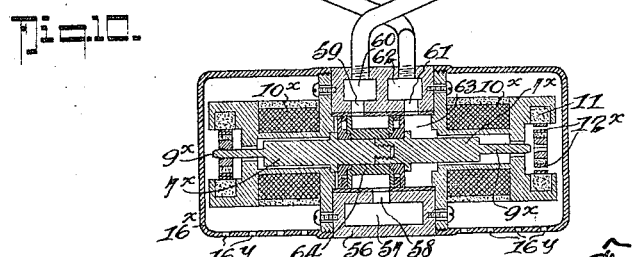

EBER FRANCIS PIERS, OF OGDEN, UTAH.

AIR-BRAKE.

1,323,093.　　　　　　　　Specification of Letters Patent.　　　Patented Nov. 25, 1919.

Application filed March 21, 1919.　Serial No. 284,014.

*To all whom it may concern:*

Be it known that I, EBER F. PIERS, a citizen of the United States, residing at Ogden, in the county of Weber, State of Utah, have invented a new and Improved Air-Brake, of which the following is a specification.

My invention, which relates to the art of air brake systems in which the braking power is transmitted to the wheels of the car by the action of compressed air delivered, under control of the operative, to a cylinder in which the power applying piston operates, has for its primary object to provide means whereby a service application of the brakes is effected automatically, even though the operative moves his controlling valve for an emergency action, thus preventing the wheels from becoming "locked" and remaining so long enough to form "flats."

Another object of the invention is to provide an effective and sensitive (in responsiveness) means for relieving the air pressure in the brake cylinder when the car wheels become "locked" (stopped) by the too sudden or severe application of the braking air, and to provide a simple apparatus for the purpose which will operate effectively regardless of weather conditions, the apparatus being of such construction and design as to reduce the number of parts to the minimum and thereby lessen the danger of failure of operation, to the minimum.

A further object of the present invention is to provide an electrically controlled mechanism for setting the relief valve to its air releasing position the instant the car wheel ceases to turn, and immediately restore the valve to its normal position as soon as the pressure is relieved enough for the wheel to begin turning again, means being also provided whereby effective braking action of a predetermined degree is reserved in the brake cylinder to effect a service application of braking pressure on the wheels until the air is released at the operative's control valve.

In its general nature the invention comprises a compound valve adapted to be piped, as a branch, to the air brake system in the line between the operative's control valve and the brake cylinder or the triple valve, an electric circuit governor operated (preferably) directly by the wheel axle and located within the axle bearing box, and electromagnetically operated and controlled means for shifting the compound valve as a unit to its different positions and including switch devices operatively controlled by the circuit governor.

In its more specific aspect the invention further includes those novel features of construction, combination and arrangement of parts, all of which will be first fully described and then be specifically pointed out in the appended claims, and illustrated in the accompanying drawings, in which:

Figure 1 is a central vertical longitudinal section of the preferred form of compound valve which constitutes one of the principal parts of my present invention, the parts being shown in the standing position.

Figure 2 is a cross section on the line 2—2 of Fig. 1.

Fig. 3 is a cross section on the line 3—3 of Fig. 1.

Fig. 4 is a cross section on the line 4—4 of Fig. 1.

Fig. 5 is a diagrammatic sectional view similar to Fig. 1 illustrating the position of the valve when the parts are in the "running position brakes released."

Fig. 6 is a diagrammatic view similar to Fig. 5, the parts being shown in the "running position brakes set."

Fig. 7 is a view similar to Fig. 5, the parts being shown at the time the wheel becomes "locked" and stops turning, and showing the parts in the position to effect the air release.

Fig. 8 represents the wiring diagram showing the operating and controlling circuits.

Fig. 9 is a diagrammatic view of the governor mechanism which I prefer to employ in connection with the compound valve.

Fig. 10 is a diagrammatic sectional view of a modified form of the invention.

In the drawings, in which like numerals and letters of reference indicate like parts in all of the figures, 1 designates the cylinder body which is provided with a chambered portion 2 that is adapted to communicate with the brake cylinder, the communication being effected either by a pipe connection directly to the pressure chamber of the brake cylinder, or by a pipe connection to the air line at some point between the brake cylinder and the operative's control valve or the triple valve as may be found convenient.

The cylinder body is also provided with a port 3 to atmosphere, the port 3 being controlled by a suitable pin valve 3ª so that the escape of air may be regulated.

4 designates the slide valve which, in the preferred form, is directly operated through the electro-magnetic instrumentalities. The valve 4 is chambered to receive the air and spring-operated slide valve 5, which valve is assisted in its travel in one direction by a suitable spring 6.

The valve 5 is, in practice, made of non-magnetic material so as to be free from the influence of the magnetic forces which operate the master valve 4.

The master valve 4 is provided with a plurality of spaced piston portions 4ª, having chambers $x$, $y$, $z$ between them. The chambers $x$, $y$, $z$ communicate with the interior of the valve 4 through ports 51, 52 and 53, respectively.

The valve 5, which is of the floating type, i. e., is not provided with operating stems, consists of a central bobbin-like body 5ª, the ends of which are grooved at 5ᵇ to receive the piston rings 5ᶜ, the rings 5ᶜ being held in place by end plates 5ᵈ—5ᵉ, the latter having a threaded shank 5ᶠ passing through the bobbin-like portion of the valve and screwing into the plate 5ᵈ, thus making it possible to insert the rings without springing them over the parts.

7 designates the armatures connected to both ends of the master valve 4, the armatures 7 being made of magnetic material, preferably soft iron, one of which armatures 7 is threaded directly into the open end of the bore of the valve 4, so that by removing that armature 7, the valve 5 may be removed and replaced, for inspection. The valve 4 has a groove 4ᵇ at its right hand end to prevent the formation of a vacuum between the end of the valve 5 and the right hand end of the valve chamber in which it operates.

Each armature 7 is provided with an insulating bushing 8 in which is mounted a contact piece 9, preferably of cylindrical shape with its extremity rounded or tapered. The contact pieces 9 are preferably made of copper.

10 designates the actuating coils of magnet wire which, when energized, serve through their action on the respective armatures 7, to shift the master valve 4 and its contained floating valve from one end to another of the cylinder, as will be later explained.

11 is an adjustably mounted insulating block which carries the switch contactors 12, the switch contactors 12 being secured to the insulating block 11 with screw and slot connection so that they may have a limited movement from and toward each other, the movement toward each other being effected by the springs 13 which also insure contact between the contactors 12 and the contact piece 9 when the same is inserted between the contactors 12. The casings 16 which house the sets of contactors 12 and the magnet coils, are provided at one end with an opening that is normally closed by a cap 15. From the outer end of each of the casings 16 is cut a pair of parallel slots 14 in which the insulating block 11 is mounted for longitudinal adjustment and secured in any desired way, as by a screw and slot connection, for example.

The casing 1 is provided with a chambered portion 17 that is in communication with the interior of the casing through ports 54—55. The outlet of the chambered portion 17 is covered with a screen 17ª.

18 designates the cylinder heads for the cylinder body or casing 1 and these heads 18 also support the magnets 10 to which they are secured in any desired way. The casings 16 and the cylinder heads 18 are secured to the flanged ends of the cylinder 1 by machine screws 19.

By referring to the wiring diagram, it will be noticed that the right hand coil 10, Fig. 1, is indicated by the reference character A' in this figure, and the left hand coil 10, Fig. 1, is indicated by the reference character A in the wiring diagram, Fig. 8. The left hand circuit closing contactors 12—12 of Fig. 1 are indicated by the reference character B in Fig. 8, and the right hand set of contactors is indicated by the character B' in the wiring diagram.

C designates the source of energy which by preference is a storage battery of any approved type, E, the condenser, D, the speed control governor (see diagrammatic view, Fig. 9) ; F, ground connections, G, the high resistance coil of the relay, H, the armature of the relay, I, the spring for regulating the armature when the coil G is deënergized, J, the circuit breaker contacts of the relay for the right hand coil A', and K, the circuit breaker contacts of the relay for the left hand coil A of the compound valve apparatus. The battery C has one of its poles connected to each of the coils A—A' (10), the left hand coil having its other terminal connected to one of the contactors 12 of the right hand set B', while the other coil A' has its other terminal connected with one of the contactors 12 of the left hand set B. The other contactor of the left hand set B connects with one of the terminals J of the relay, the other terminal J of the relay connecting with one of the terminals K and also with the storage battery C, while the other of the terminals K connects with the remaining contactor 12 of the right hand switch B'. The high resistance relay coil G has one end grounded at F and the other end in connection with one pole of the storage battery, the other pole of which is connected to one contact element 27 of the governor while the other contact element 26 of the governor is grounded at F, the condenser E being connected across the terminals 26—27 respectively to prevent arcing.

In the present application I have only diagrammatically illustrated the circuit governor. This governor may be of any approved type which will close the electric circuit as soon as the car wheel starts to turn and open the circuit the instant the car wheel stops turning but I prefer to employ the governor shown in my copending application filed on even date herewith, Serial No. 284,015, as that has been especially designed for use in connection with the present apparatus, although it may be used in other apparatus and hence in this application I make no claim, per se, to the specific governor construction since that forms the subject matter of my copending application referred to. The governor referred to, in its general nature, consists of a pair of contact elements 26—27 which rotate together and are mounted on the end of the car wheel axle within the journal box, the electric circuit being closed between the elements 26—27 upon rotation of the car wheel by mercury 37 contained in the pockets 38 formed in the element 26, which mercury, on rotation of the parts, pours out through the outlets of the pockets and closes the circuit between the members 26—27 but as soon as the rotation ceases, the circuit will be instantly broken. A further detailed description of the governor is thought to be unnecessary.

So far as described, the manner in which my invention operates is as follows:—Assume the car to be at rest and the air released,—the parts will then be in the position shown in Fig. 1, while in the wiring diagram the circuit at the governor D will be open, hence the circuit will be closed across the terminals K and open across the terminals J. No current will flow, however, for the reason that the circuit at B' is open at this time. As soon as the car starts in motion, the circuit will be closed at governor D which energizes the coil G, pulls down the armature H, breaking the contact at K and closing the circuit at J, thereby permitting the battery current to flow across the contactors 12—12 of the left hand set B (Fig. 8) and thereby energizing the right hand coil A' of the electromagnet 10 at the right in Fig. 1 and consequently pulling over the master valve 4 with the floating valve 5 in its initial position within the master valve. The parts then assume the position shown in Fig. 5, the running position with brakes released. The movement of the master valve from left to right in Fig. 1, opens the circuit at contactors set B and closes the circuit at contactors set B', thus breaking the circuit through the right hand coil A'. No current will then flow from battery C through either of the coils A or A'. Now, assume that the operative applies the brakes: On doing this the air under pressure enters the chamber 2, passes through the ports 50 into chamber $x$ from thence it passes through ports 51 into the interior of the valve 4 between the left hand ends of the valves 4 and 5, thereby forcing over the valve 5 from left to right, in Fig. 1, against the tension of the spring 6, and bringing the ports 52—53 into communication with one another. The air, however, will not escape in this position since there is no channel of communication between the chamber $x$ and either of the chambers $y$ and $z$. In this position, the parts are as shown in Fig. 6, in the running position with the brakes set. As soon as the momentum of the car has become reduced enough to cause the wheels to become "locked" by the braking force (which occurs when the operative fails to release his air as the car slows down) the instant the wheel stops turning the electric circuit at the governor D will be opened, with the result that the magnet G becomes deënergized and armature H rocks to open the circuit at J and close it at K. As soon as this occurs the current from battery C will flow across contacts K and across contactors 12 of the right hand set B' and through the left hand coil A to battery, thereby energizing the left hand coil which will cause the master valve and its contents to be drawn over again to the left hand extremity of the cylinder 1, the parts now being in the position shown in Fig. 7, the position of the parts when the wheel has become "locked" or ceased turning and the air is still applied. When the parts are in this position it will be observed that the air from the brake cylinder in chamber 2 passes through the ports 50 into the chamber $y$ and through ports 52—53 into chamber $z$ which is in communication through the port 54 with the exhaust duct 17 of the valve, thus allowing the air pressure in the brake cylinder to be "bled" or reduced. At the same time the air from the space to the left of the valve 5 is escaping through the ports 51, chamber $x$ and port 3 at the predetermined rate dependent upon the position of the needle valve 3$^a$. When the air pressure in the chamber $x$ has fallen to a point where it will approximately equalize the pressure in the chamber $y$ the spring 6 will function to push valve 5 over to its initial position at the left thereby cutting off the escape of air through the ports 53 to the chamber $z$ and hence holding the remaining air pressure in the brake cylinder. By adjusting the needle valve 3$^a$ this holding pressure may be regulated to any degree desired, it being understood that the holding pressure is such as will not "lock" the wheels against rotation. As soon as the pressure in the brake cylinder has been reduced enough so that the wheel can commence to turn again, the circuit at governor D will be closed again, with the result that the valve 4 will be again drawn over to its right hand position, ready for another action.

When the car is standing still and the brakes are applied the air pressure in the brake cylinder will be communicated to the chamber 2, the air passing through the ports 50 into chamber y through the ports 52 into the interior of the valve 4 and between the ends of the valve 5. In this position of the valves 4 and 5, however, there can be no escape of air since the ports 52 are closed against communication with the ports 53 and 51.

It will also be noticed that when the valve 4 moves from left to right, the air contained in the space at the right of valve 4 acts as a cushion to prevent undue jar of the parts at the end of the movement as the right hand coil 10 is energized for about ninety per cent. of the stroke of the valve 4. During the movement of the valves from the left hand position, Fig. 1, to the right, both valves move as a unit, the valve 5 maintaining the same operative position with the valve 4 during the entire movement and remains at the extreme left of its travel, being held in that position by the spring 6.

On the return movement of the valve 4, from right to left, the air contained at the left of the valve will also act as a cushion to prevent undue jar of the parts on the return movement. The air at the left of the valve 5 during the movement of the valve 5 from one extremity to the other will also serve to cushion the action of said valve and prevent forceful impact of the valve against the opposing wall.

It will also be noticed from the foregoing that the valve 5 is thoroughly protected from mechanical injury and there is nothing to prevent its action. Therefore, in the event of failure of current, failure of governor device or mechanical injury, the device cannot release air from the brake cylinder and endanger the braking power of the brakes.

Any dirt or foreign substance entering the valve from the brake cylinder is automatically discharged by gravity through the port 54. The screen 17ª prevents dirt from entering the exhaust side. In order to inspect, clean and lubricate the parts the studs 19 may be removed from one end and access to the valves is thus obtained. Removing the examination covers 15 allows thorough inspection of the switch contactors 12 and contact pieces 9, and the entire block 11 and the switch contactors carried thereby can readily be removed through the opening when the cover 15 is taken off for inspection or repair.

It is to be understood, of course, that where parts are secured together, suitable key pins or other well-known mechanical devices will be employed to hold the parts against accidentally unscrewing but as that is a mere mechanical detail of structure I thought it unnecessary to illustrate the same.

I desire to call attention to the fact that by the use of my invention in case of a full stop of the car, enough air is released to prevent and eliminate all chatter and shock to cars and brakes and then immediately afterward the full air pressure is allowed to be maintained indefinitely on the brakes while in a standing position.

My apparatus does not in any way interfere with the normal operation of the air brakes, preventing only the sliding of the wheels on the rail while the car body proper is in motion; it insures full braking efficiency, regardless of rail conditions, making the braking equipment more efficient and eliminating all hazard of a sliding car; it precludes all necessity for wheel changes on account of "flats"; it saves air inasmuch as the car can be brought to a stop in the minimum amount of travel after the brakes have been applied without the possibility of "flatting" or sliding a wheel on the rail. With my invention it will be unnecessary to make the usual long-drawn-out stops effected by alternately applying and releasing air until stop has been made. The invention will operate equally well on "automatic" and "straight" air brake equipment. The air is not touched until after it has functioned in the brake cylinder.

In Fig. 10, I have diagrammatically illustrated a modification of the invention in which the master valve 4 is also of the "floating" type and moved from the left to the right by air pressure from the main reservoir.

In this modification of the invention, the compound valve is indirectly shifted through an electromagnetic valve device and compressed fluid. This device includes a cylinder 56 having a chamber 57 that is adapted to be supplied with fluid under main reservoir pressure, the fluid being distributed through the control valve 64 via ports 58, 59, 60 and duct 60ª to the right hand end of cylinder 1 or when the valve 64 is in the opposite position to that shown in Fig. 10, the fluid is distributed via ports 58, 61, 62 and duct 62ª to the left hand end of the cylinder. The valve 64 is shifted to the right or left by the magnets 10ˣ (corresponding to the diagram windings A' and A, see Fig. 8). Suitable contactor sets 12ˣ—12ˣ (corresponding to the sets B—B', Fig. 8) are arranged to be closed by the plungers $9^c$ on the armatures $7^x$ which carry the valve 64.

The air in cylinder chamber 63 at the ends of the valve 64 escapes through the spaces around armatures $7^x$ into the cases $16^x$ out through ports $16^y$ to atmosphere.

The operation of this form of the invention differs from that of the preceding form only in that when valve 64 is shifted from left to right (i. e., when right hand coil $10^x$, A' is energized as the car wheel starts to turn the air will pass from chamber 57 to port 58 around the barrel of valve 64 through port 61 to chamber 62, from whence it passes, through duct $62^a$, into the left hand end of cylinder 1 and forces the valve 4 to the right. The air at the right of the valve 4 passes through duct $60^x$ to chamber 60 and via port 59, into the casing 56 around the barrel of the valve 64 and escaping around the left hand armature $7^x$ into case $16^x$ from which it exhausts to atmosphere via ports $16^y$. As soon as the car wheel ceases to turn, the valve 64 is shifted back to the left (by energization of the left hand magnet $10^x$, A') and the valve 4 will likewise be forced back in the same direction. The action of the valves 4 and 5 on the brake cylinder air is the same in this form as in the previously described form and a repetition of the description of this action is thought to be unnecessary.

Other modifications of the invention can readily be made without departing from the spirit of the invention or the scope of the appended claims and I do not wish to be understood as limiting myself to the specific details of construction shown and described beyond what may be required by the state of the prior art.

What I claim is:

1. In apparatus of the class described, a valve mechanism adapted to be connected with the air brake cylinder and having instrumentalities for relieving the air pressure therein, combined with an electromechanical means including a circuit opening and closing device actuated by the motion of the car wheel for controlling the action of said instrumentalities.

2. In apparatus of the class described, a cylinder having a port in communication with the atmosphere and another port adapted to communicate with the brake cylinder of the air brake system, a valve operating in said first mentioned cylinder to bring said ports into communication at times, and electrically actuated mechanism including a circuit opening and closing device coöperative with the rotation of the car wheel for shifting said valve.

3. In apparatus of the class described, the combination with a compound valve mechanism including shiftable valve elements for relieving the air pressure in a braking cylinder; of electro-operative means for causing the shifting of said valve elements from one position to another according as the wheel of the car rotates or ceases to rotate to thereby hold or release respectively the air in the brake cylinder, said electro-operative means itself including a circuit opening and closing device functioning in harmony with the car wheel.

4. In apparatus of the class described, the combination with a compound valve mechanism including shiftable valve elements for relieving the air pressure in a braking cylinder; of electro-operative means for causing the shifting of said valve elements from one position to another according as the wheel of the car rotates or ceases to rotate to thereby hold or release respectively the air in the brake cylinder, said electromagnetic means including operating magnets, a source of current energy connected therewith, current switches, and a relay for causing the energization of the electromagnets alternately, and a circuit governor operative in harmony with the rotation of the car wheel for governing the action of said relay.

5. A compound valve mechanism including a cylinder having a chamber adapted to be connected with an air brake cylinder, a compound valve itself including a master valve and a floating valve in said cylinder, said cylinder having ports from said chamber into the the interior of the cylinder and exhaust ports, said chamber governed by the position of said compound valve, electrically controlled means for actuating said valve to hold the air pressure in the brake cylinder when the car is at rest with the brakes applied and while the car wheels are turning with the brakes applied, and to relieve the air pressure on the brake cylinder when the wheels of the car cease to turn.

6. A compound valve mechanism comprising a cylinder, a master piston valve in said cylinder dividing the cylinder into several chambers, said cylinder having exhaust ports to atmosphere and an inlet port adapted to be connected in communication with the brake cylinder of the air brake system, said ports being governed by said master valve, said master valve having an internal chamber, a second valve in the master valve chamber, said master valve having ports for effecting communication between its internal chamber and said cylinder chambers, said second valve controlling said last named ports, externally governed means for shifting said master valve with said second valve as a unit in one direction, said second valve adapted to be shifted further in the same direction by the pressure of the air within the cylinder, said valves when shifted in said unitary direction serving to hold the air pressure against relief, means for shifting said valves as a unit back to the initial position of the master valve whereby to effect communication between the inlet port of said valve cylinder and the exhaust port of the same to relieve the air pressure, and means for moving said second valve to close off the relieving communication when the pressure has fallen below a predetermined degree.

7. In apparatus of the class described, mechanism for reducing the pressure in an air brake cylinder from emergency to service application, said mechanism comprising a compound valve apparatus adapted to be connected with the air brake cylinder and having provision for exhausting the air from said air brake cylinder to atmosphere at times, said apparatus including a compound valve itself including a master valve and a floating valve for controlling the pressure relief and electro-operative mechanism governed by the movement of the car wheel for shifting said valve apparatus to its functioning positions.

8. A compound valve mechanism comprising a valve casing having a chamber and having intake ports to said chamber and exhaust ports from said chamber, a compound piston valve itself including a master valve and a floating valve operating in said casing for controlling the communication between said intake ports and said exhaust ports, means for shifting said compound valve from one position to another, and means for cushioning the motion of said compound valve at the extremities of its movement.

9. A compound valve mechanism comprising a valve casing having a chamber and having intake ports to said chamber and exhaust ports from said chamber, a compound piston valve operating in said casing for controlling the communication between said intake ports and said exhaust ports, means for shifting said compound valve from one position to another, means for cushioning the motion of said compound valve at the extremities of its movement, said compound valve itself comprising a master valve having a chamber and ports for effecting communication between the exterior of the master valve and the internal chamber thereof, and a floating valve within the chamber of the master valve for controlling the ports communicating with the chamber of the master valve, said cushioning means including provisions for cushioning the stroke of the floating valve.

10. In apparatus of the class described, a compound valve mechanism comprising a cylinder, heads secured to said cylinder, casings secured to said heads, operating electromagnets in said casings, circuit closing and opening switch contacts in said casings, a compound valve in said cylinder, armatures connected to the ends of said valve and projecting through the cylinder heads into said casings, circuit closers carried by said armatures and coöperating with said contacts, and electric circuit instrumentalities coöperatively connected with said electromagnets and contact devices and including a governor adapted to operate in harmony with the movement of the car wheel for alternately energizing said electromagnets to shift the compound valve from one extremity to another according as the car wheel is turning or is at rest, said cylinder having a pressure chamber adapted to be connected with the air brake cylinder and having a port in communication with the interior of the same, said cylinder having exhaust ports, said inlet and exhaust ports of said cylinder being controlled by said compound valve, said cylinder having a supplemental relief port also controlled by said compound valve substantially as shown and for the purposes described.

11. A compound valve mechanism comprising a cylinder having a pressure chamber and an exhaust chamber, ports between the pressure chamber and the interior of the cylinder, ports between the interior of the cylinder and the exhaust chamber, said cylinder having a supplemental relief port to atmosphere from the interior of the cylinder, means for varying the effect of said relief port, a compound valve operating in said cylinder for controlling said ports, said compound valve comprising a master valve having a tubular body provided with a plurality of piston members spaced apart to divide said cylinder into three intermediate chambers and two end chambers, a floating valve within said tubular body for controlling the ports of said tubular body, said floating valve being movable in one direction within said tubular body by fluid pressure, means for moving said floating valve in an opposite direction when said fluid pressure is released, means for moving said master valve and its contained floating valve as a unit from one end of said cylinder to the other, and means for cushioning the strokes of said valves adjacent to the limits of their movements.

12. A compound valve mechanism comprising a cylinder having a pressure chamber and an exhaust chamber, ports between the pressure chamber and the interior of the cylinder, ports between the interior of the cylinder and the exhaust chamber, said cylinder having a supplemental relief port to atmosphere from the interior of the cylinder, means for varying the effect of said relief port, a compound valve operating in said cylinder for controlling said ports, said compound valve comprising a master valve having a tubular body provided with a plurality of piston members spaced apart to divide the cylinder into three intermediate chambers and two end chambers, a floating valve within said tubular body for controlling the ports of said tubular body, said floating valve being movable in one direction within said tubular body by fluid pressure, means for moving said floating valve in an opposite direction when said fluid pressure is released, means for moving said master valve and its contained floating valve as a unit from one end of said cylinder to the other, means for cushioning the strokes of said valves adjacent to the limits of their movements, said means for moving said master valve from one end of the cylinder to the other comprising electro-magnetically actuated devices and a circuit controller operative in harmony with the rotation of the car wheels.

EBER FRANCIS PIERS.